United States Patent [19]
Becker et al.

[11] 3,762,535
[45] Oct. 2, 1973

[54] CHAIN FOR FLIGHT CONVEYOR

[75] Inventors: Roger T. Becker; Donald McMullin, Jr.; John J. Nelson, all of Kalamazoo, Mich.

[73] Assignee: Kalamazoo Conveyor Company, Kalamazoo, Mich.

[22] Filed: Apr. 13, 1972

[21] Appl. No.: 243,609

[52] U.S. Cl. .............................................. 198/168
[51] Int. Cl. ............................................. B65g 19/00
[58] Field of Search ........................... 198/189, 168

[56] References Cited
UNITED STATES PATENTS
| | | | |
|---|---|---|---|
| 2,297,813 | 10/1942 | Stork | 198/189 |
| 3,246,734 | 4/1966 | Carvallo | 198/189 |
| 3,282,405 | 11/1966 | Larson | 198/168 |
| 3,270,862 | 9/1966 | Goldberg | 198/189 |

Primary Examiner—Richard E. Aegerter
Attorney—Samuel Kurlandsky

[57] ABSTRACT

A novel chain is provided for a flight conveyor comprising a tube and an endless chain disposed therein, loading and unloading stations, a sprocket engaging the chain, and power means driving the sprocket, the chain being comprised of alternate sprocket links and flight links connected together by a transposition link transposing each successive link through an angle of 90°, thereby imparting a universal-type action to the chain and permitting it to be used with tubes which are not disposed in a single plane.

10 Claims, 6 Drawing Figures

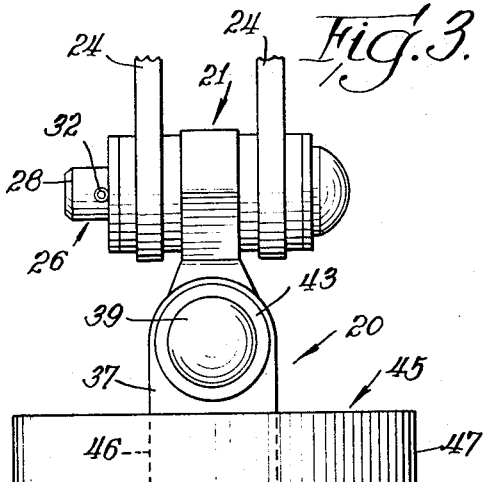
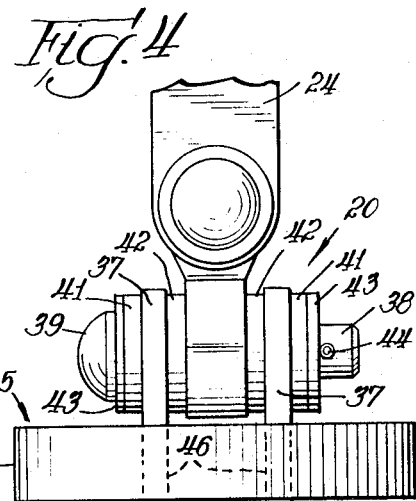
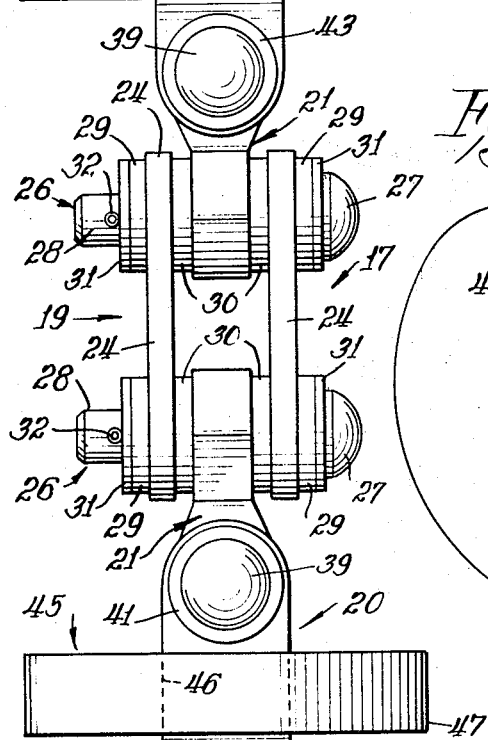
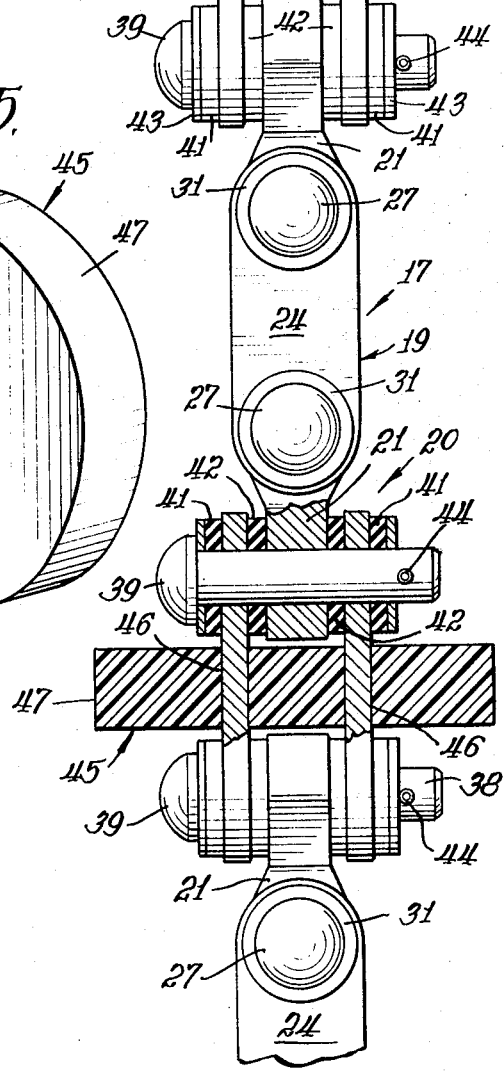
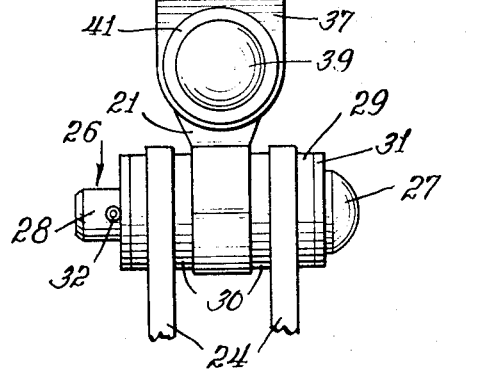

CHAIN FOR FLIGHT CONVEYOR

BACKGROUND OF THE INVENTION

The present invention relates to conveyors and particularly refers to tube-type conveyors or flight conveyors utilized for transporting bulk particulate material or liquids from one place to another and from one elevation to another.

Conveyors of the type described are particularly useful in conveying particulate solids or liquids which are extremely corrosive, or which are utilized in the preparation of food or medicinal products and must be kept extremely clean or free from bacteria or other organisms. To accomplish such results, the chains for such conveyors are generally so constructed that the flights or structures which accomplish the actual moving of the material to be transported are close fitting to the chain on which they are mounted. Additionally, the chain structure has been so designed that the pivot pins of the links are well sealed so that their shanks do not come into contact with the transported material. In the tubular conveyors which are so designed that the tube lies in substantially a single plane, this has been readily accomplished. However, for installations in which the tube is not mounted in a single plane but has lateral displacement, it is necessary for the chain to have a universal movement so that it may bend laterally as well as up and down in a single plane. Such structures disclosed in the art have been quite complicated and have not provided as good insulation or sealing of the working parts from the material to be moved as have conveyors designed to be mounted in only a single plane.

SUMMARY OF THE INVENTION

Accordingly, it is an object of the present invention to provide a chain for a tubular or flight conveyor having links so designed that the chain may bend in either a horizontal or vertical direction.

It is a further object to provide a chain for a conveyor in which the pivot pins are suitably sealed from contact with the material being conveyed.

It is still further an object to provide a conveyor chain which may be formed of relatively few parts which may be readily assembled.

It is a further object to provide a conveyor chain which is less expensive to construct than conveyor chains disclosed in the prior art.

Still further objects and advantages of the invention will appear as the description proceeds.

To the accomplishment of the foregoing and related ends, the invention, then, consists of the conveyor chain herein fully described and particularly pointed out in the claims, the annexed drawings and the following description setting forth an illustrative embodiment of the invention, such disclosed embodiment illustrating, however, but one of the various ways in which the principle of the invention may be used.

BRIEF DESCRIPTION OF THE DRAWINGS

In the annexed drawings:

FIG. 3 is a top view of a segment of the chain according to the invention.

FIG. 4 is similar to that of FIG. 3 but in which the chain is rotated about its axis through an angle of 90°, and partly in cross-section.

FIG. 5 is a perspective view of a single flight; and

DESCRIPTION OF THE SPECIFIC EMBODIMENT

Figure 1:
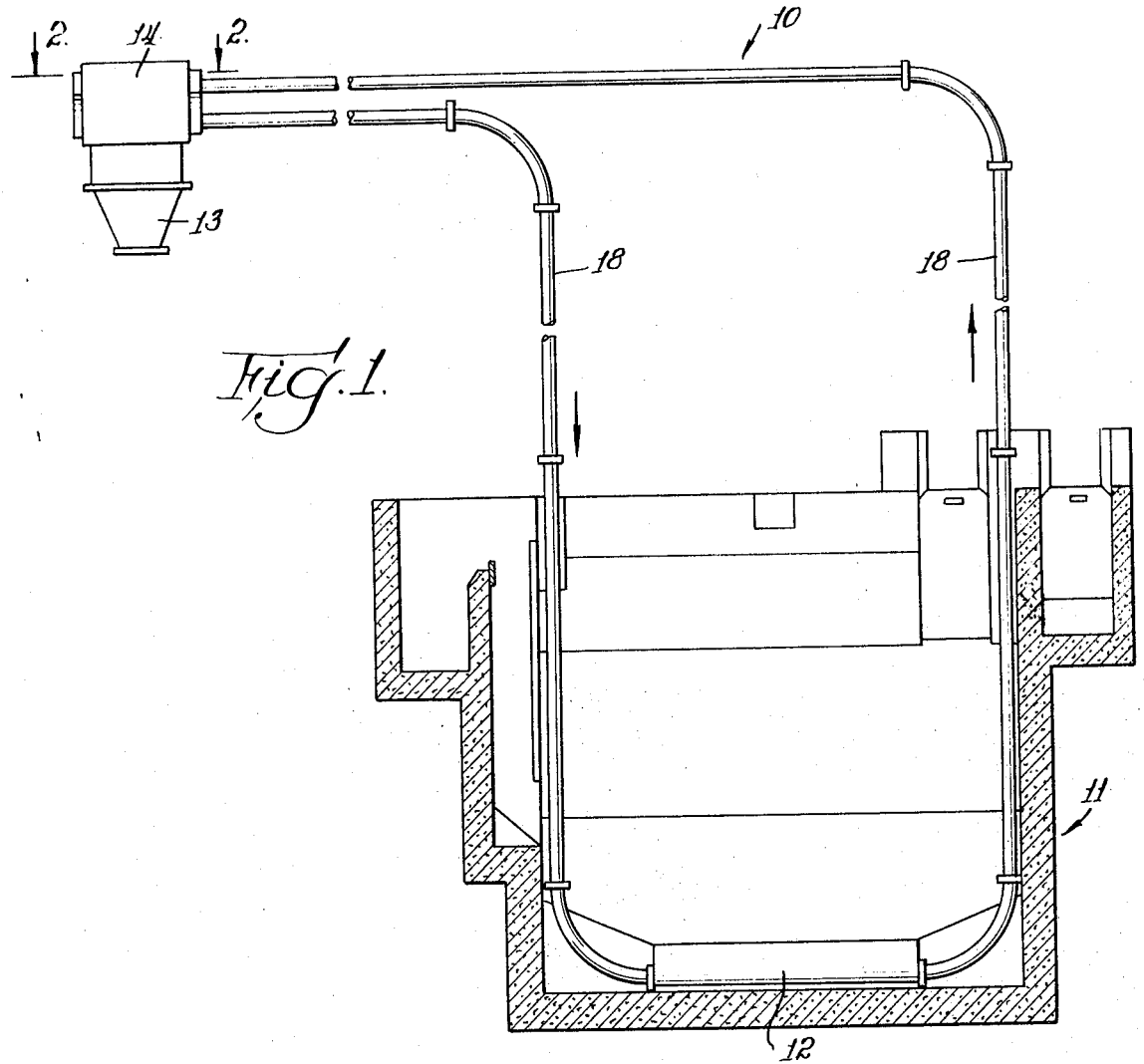
FIG. 1 is a side elevational view, partially in cross-section, showing a tubular conveyor, and associated quipment.
Figure 2:
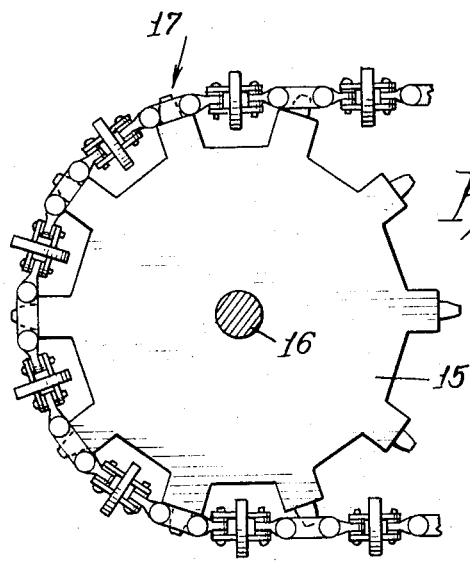
FIG. 2 is a side elevational view of a sprocket and chain of the conveyor.

Referring more particularly to FIG. 1, the flight conveyor 10 is shown in ssociation with a conventional tank 11, a loading hopper 12, and a discharge hopper 13. A housing 14 encloses a motor, transmission, pulleys and belts, not shown, and a sprocket 15 mounted on a shaft 16 (FIG. 2). A flight chain 17 is disposed over the sprocket and is disposed within the conveyor tube 18.

The flight chain 17 of the present invention, as shown more particularly in FIGS. 3 and 4, is formed of a plurality of sprocket links 19, flight links 20 and transposition links 21. Each sprocket link 19 is connected to a flight link 20 by means of a transposition link 21.

Each sprocket link 19 is comprised of a pair of spaced-apart substantially parallel link plates 24, a pivot pin 26 having a head 27 and a shank 28 disposed through pivot pin-receiving apertures provided in the ends of the link plates, outer sealing washers 29, inner sealing washers 30, retaining washers 31 and retaining pins 32. The link plates 24 and pivot pins 26 are preferably of a metal such as steel. The sealing washers 29 and 30 may be made of natural or synthetic rubbers or resilient plastic material such as "Neoprene," polyvinyl plastic materials, et cetera. The retaining washers 31 are preferably of metal such as steel or any material which will withstand the applied force without deformation. They may be flat washers or conical or any other suitable shape. The retaining pin 32 may be a cotter pin, spiral retaining pin, roll pin or any other retaining pin known in the art.

As shown more particularly in FIG. 4, the flight link comprises a pair of link plates 37, a pivot pin 38 having a head 39 and a shank 40 disposed in pivot pin apertures provided in the ends of the link plates. Outer sealing washers 41, inner sealing washers 42, and retaining washers 43 are mounted over the pivot pins. Retaining pins 44 maintain the links in assembly and may be the same as the pins 32. The parts of the flight links are made of the same materials as that of the sprocket links. Flights 45 are mounted on the flight link plates 37. As shown particularly in FIG. 5, each flight is generally of plate form having apertures 46 provided therein for receiving the link plates 37 of the sprocket links. The flight is held securely over the link plates and between each pivot joint. The periphery 47 of the flight 45 is of the same contour as that of the inner contour of the tube 18 in which the flight is disposed. In FIG. 5, a flight is illustrated having a circular outer contour. However, if square, rectangular, oval, or other shaped tubes are used, the flight is constructed to have a complementary contour in order to make a close fit with the inner surface of the tube. The flight may be made of any of a number of materials, for example metals such as cast iron, stainless steel, zinc, brass, et cetera; plastic material such as rubber, polyethylene, polyurethane, polypropylene, poylstyrene, etc; or even materials such as wood or other natural products. The material used to form the flight 45 depends to a large degree upon the nature of the material to be conveyed.

Figure 6:
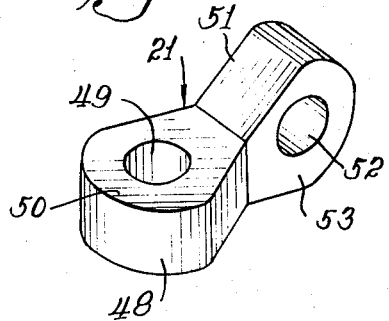
FIG. 6 is a perspective view of a transposition link of the chain.

In order to enable the conveyor chain to bend laterally as well as vertically for installations where the tube 18 in which the chain is disposed has lateral bends as well as vertical bends, each sprocket link 19 is connected to adjacent flight links 20 by means of a transposition link 21 shown in detail in FIG. 6. The transposition link 21 comprises a first link member or collar 48 having a pivot pin-receiving channel 49 and spaced-apart substantially parallel bearing surfaces 50 adapted to be engaged by the inner sealing washers 30 and 42. Integrally connected to the first link member or collar 48 is a second link member or collar 51 disposed in a plane perpendicular to that in which the first collar 48 lies. The second collar 51 is provided with an axial channel 52 adapted to receive a pivot pin 26 or 38. The axial channel 52 has an axis substantially perpendicular to an imaginery plane passing through the axis of the first axial channel 49 and through the axis of the transportation link. The transposition link may be made of any suitable materials such as metals, as for example steel, iron, aluminum, brass; or plastic materials preferably of high impact and tensile strength, such as polypropylene, polycarbonates, polystyrene, polyurethane, et cetera.

The conveyor chain of the present invention may be readily assembled by forming each link and connecting it to a transposition link by means of a pivot pin.

In assembling each link, a retaining washer 31 or 43 is placed over a pivot pin 27 or 39. An outer sealing washer 29 or 41 is then added and a link plate 24 or 37 placed thereover. An inner sealing washer 30 or 42 is then placed over the plate and a collar of a transposition link 21 placed over the inner sealing washer. A second inner sealing washer 30 or 42, a second link plate 34 or 37, an outer sealing washer 29 or 41, and a metal retaining washer 31 or 43 are then placed over the pivot pin. The retaining pin 32 or 44 is then inserted in the aperture provided at the end of the pivot pin to complete assembly of the link. The link may be disassembled in similar manner by removing the retaining pin and withdrawing the pivot pin.

The chain of the present invention has a prime advantage in that it is made of relatively few parts. Both the sprocket links and the flight links may be made of the same link plates and washers, with the ends of the link plates connected to a transposition link. In spite of its simplicity, the structure provides complete sealing of the pivot pin shank and additionally permits universal movement of the chain. The chain is made of inexpensive materials which are readily obtained. Only the transposition link is not available on the market, but may be relatively simply molded, stamped or fabricated by other well-known operations.

While but only one form of the invention has been shown and described, other forms will now be apparent to those skilled in the art. Therefore, the embodiment shown in the drawings is merely for illustrative purposes, and is not intended to limit the spirit and scope of the invention as above described and illustrated in the drawings.

The embodiments of the invention in which an exclusive property or privilege is claimed are defined as follows:

1. An endless chain for a tubular conveyor, said chain including a plurality of links comprising:
   a. a plurality of flight links each comprising a pair of substantially parallel spaced-apart link plates each having a pivot pin-receiving aperture provided at each end, and a flight mounted on said link plates substantially perpendicular thereto;
   b. a plurality of sprocket-engaging links each comprising a pair of substantially parallel spaced-apart link plates each having a pivot pin-receiving aperture provided at each end;
   c. a plurality of transposition links each connecting adjacent flight links and sprocket links comprising a pair of integrally connected single-ended link members, each link member having a pivot pin-receiving channel provided therein, the axis of the channel of one link member being disposed substantially perpendicular to an imaginery plane passing through the axis of the channel of the other link member and through the axis of said transposition link, each link member being interposed between a pair of adjacent link plates; and
   d. a plurality of pivot pins disposed within the pivot pin-receiving apertures of said link plates and through the channels of said transposition links, and retaining means retaining said pivot pins within said chain links, thereby pivotally connecting each transposition link to a pair of adjacent links.

2. An endless chain according to claim 1, wherein said flight links and said sprocket links are alternately arranged and connected together by said transposition links.

3. An endless chain according to claim 1, wherein each link member of said transposition links is provided with substantially parallel bearing surfaces substantially perpendicular to the axis of the channel provided therein.

4. An endless chain according to claim 1, wherein each flight is provided with apertures having the link plates of the flight link on which said flight is mounted disposed therein.

5. An endless chain according to claim 1, wherein four resilient sealing washers are mounted on each pivotal pin, two intermediate said transposition link member and said link plates, and two outwardly of said link plates, and a pair of metallic washers mounted one outwardly of each of said outwardly disposed sealing washers.

6. In a tubular conveyor comprising a tube, an endless conveyor chain mounted therein, means for driving said chain, and loading and unloading stations, the improvement wherein said chain comprises a plurality of links comprising:
   a. a plurality of flight links each comprising a pair of substantially parallel spaced-apart link plates having a pivot pin-receiving aperture provided at each end, and a flight mounted on said link plates substantially perpendicular thereto;
   b. a plurality of sprocket-engaging links each comprising a pair of substantially parallel spaced-apart link plates each having a pivot pin-receiving aperture provided at each end;
   c. a plurality of transposition links each connecting adjacent flight links and sprocket links comprising a pair of integrally connected single-ended link members, each link member having a pivot pin-receiving channel provided therein, the axis of the channel of one link member being disposed substantially perpendicular to an imaginery plane passing through the axis of the channel of the other link member and through the axis of said transposition link, each link member being interposed between a pair of adjacent link plates; and d. a plurality of pivot pins disposed within the pivot pin-receiving apertures of said link plates and through the channels of said transposition links, and retaining means retaining said pivot pins within said chain links, thereby pivotally connecting each transposition link to a pair of adjacent links.

7. An endless chain according to claim 6, wherein said flight links and said sprocket links are alternately arranged and connected together by said transposition links.

8. An endless chain according to claim 6, wherein each link member of said transposition links is provided with substantially parallel bearing surfaces substantially perpendicular to the axis of the channel provided therein.

9. An endless chain according to claim 6, wherein each flight is provided with apertures having the link plates of the flight link on which said flight is mounted disposed therein.

10. An endless chain according to claim 6, wherein four resilient sealing washers are mounted on each pivotal pin, two intermediate said transposition link member and said link plates, and two outwardly of said link plates, and a pair of metallic washers mounted one outwardly of each of said outwardly disposed sealing washers.

* * * * *

PO-1050
(5/69)

UNITED STATES PATENT OFFICE
CERTIFICATE OF CORRECTION

Patent No. 3,762,535          Dated October 2, 1973

Inventor(s) Roger T. Becker, Donald McMullin, Jr., and John J. Nelson

It is certified that error appears in the above-identified patent and that said Letters Patent are hereby corrected as shown below:

Column 1, line 64, for "quipment" read -- equipment --.
Column 2, line 10, for "ssociation" read -- association --;
         line 65, correct the spelling of "polystyrene".
Column 3, lines 18-19 for "transportation" read
         -- transposition -- .

Signed and sealed this 15th day of January 1974.

(SEAL)
Attest:

EDWARD M. FLETCHER, JR.          RENE D. TEGTMEYER
Attesting Officer              Acting Commissioner of Patents